US008459666B2

(12) United States Patent
Piehl et al.

(10) Patent No.: US 8,459,666 B2
(45) Date of Patent: Jun. 11, 2013

(54) SIDE-BEAM LIFT ASSEMBLY FOR HEAVY-DUTY VEHICLES

(75) Inventors: Daniel J. Piehl, Mitchell, SD (US); Kevin J. Erdmann, Mitchell, SD (US)

(73) Assignee: Hendrikson USA, L.L.C., Itasca, IL (US)

( * ) Notice: Subject to any disclaimer, the term of this patent is extended or adjusted under 35 U.S.C. 154(b) by 0 days.

(21) Appl. No.: 13/301,056

(22) Filed: Nov. 21, 2011

(65) Prior Publication Data
US 2012/0126504 A1 May 24, 2012

Related U.S. Application Data

(60) Provisional application No. 61/416,088, filed on Nov. 22, 2010.

(51) Int. Cl.
*B62D 61/12* (2006.01)
(52) U.S. Cl.
USPC ............. 280/86.5; 280/124.116; 280/124.157
(58) Field of Classification Search
USPC .......................... 280/86.5, 124.116, 124.157
See application file for complete search history.

(56) References Cited

U.S. PATENT DOCUMENTS

| 3,771,812 | A |   | 11/1973 | Pierce et al. |
| 4,171,830 | A |   | 10/1979 | Metz |
| 4,300,787 | A | * | 11/1981 | Vandenberg .................. 280/86.5 |
| 4,763,953 | A | * | 8/1988 | Chalin .......................... 298/17 S |
| 5,058,917 | A | * | 10/1991 | Richardson .................. 280/86.5 |
| 5,230,528 | A |   | 7/1993 | Van Raden et al. |
| 5,403,031 | A | * | 4/1995 | Gottschalk et al. .......... 280/86.5 |
| 5,505,481 | A |   | 4/1996 | VanDenberg et al. |
| 5,588,665 | A |   | 12/1996 | Pierce et al. |
| 5,655,788 | A |   | 8/1997 | Peaker |
| 5,791,681 | A |   | 8/1998 | VanDenberg |
| 5,915,705 | A |   | 6/1999 | VanDenberg |
| 6,003,885 | A | * | 12/1999 | Richardson .................. 280/86.5 |
| 6,007,078 | A | * | 12/1999 | Gottschalk et al. ...... 280/86.751 |
| 6,073,946 | A | * | 6/2000 | Richardson .................. 280/86.5 |
| 6,322,089 | B1 |  | 11/2001 | Dantele et al. |
| 6,398,236 | B1 |  | 6/2002 | Richardson |
| 6,416,069 | B1 |  | 7/2002 | Ramsey |

(Continued)

FOREIGN PATENT DOCUMENTS

| EP | 0836984 B2 | 9/1997 |
| EP | 0941915 A1 | 2/1999 |

OTHER PUBLICATIONS

Hendrickson Trailer Suspension Systems, Center Lift Kit Underslung, Tabulated, Jun. 14, 1985, Canton, Ohio.

*Primary Examiner* — Ruth Ilan
(74) *Attorney, Agent, or Firm* — Dureska, Kennedy & Moore LLC; David P. Dureska; Brent L. Moore

(57) ABSTRACT

A lift assembly for a suspension assembly of an axle/suspension system is located generally adjacent to and beside the suspension assembly. The lift assembly includes an air chamber, a support member assembly, a pivot arm assembly and a beam support assembly. The support member assembly attaches to the hanger of the suspension assembly, to the air chamber, and pivotally attaches to the pivot arm assembly. The air chamber also attaches to the pivot arm assembly. The pivot arm assembly pivotally attaches to the beam support assembly which in turn attaches to the beam of the suspension assembly, for raising and/or lowering the suspension assembly during operation of the heavy-duty vehicle.

10 Claims, 8 Drawing Sheets

U.S. PATENT DOCUMENTS

| | | | |
|---|---|---|---|
| 6,439,587 B2 * | 8/2002 | Fabris | 280/124.11 |
| 6,471,223 B1 * | 10/2002 | Richardson | 280/86.5 |
| 6,752,406 B2 | 6/2004 | Pierce et al. | |
| 6,796,566 B2 * | 9/2004 | VanDenberg | 280/86.5 |
| 6,845,989 B2 | 1/2005 | Fulton et al. | |
| 6,883,813 B2 | 4/2005 | Gottschalk | |
| 7,896,369 B2 * | 3/2011 | Tomlin et al. | 280/124.116 |
| 2003/0107198 A1 * | 6/2003 | VanDenberg | 280/86.5 |
| 2006/0249922 A1 * | 11/2006 | Hinz | 280/124.116 |
| 2010/0140892 A1 | 6/2010 | Dodd | |

* cited by examiner

SIDE-BEAM LIFT ASSEMBLY FOR HEAVY-DUTY VEHICLES

CROSS-REFERENCE TO RELATED APPLICATION

This application claims the benefit of U.S. Provisional Patent Application Ser. No. 61/416,088, filed Nov. 22, 2010.

BACKGROUND OF THE INVENTION

1. Field of the Invention

The present invention relates to axle/suspension systems, and in particular to lift assemblies or lift axle suspensions for axle/suspension systems of heavy-duty commercial vehicles. More specifically, the invention relates to a side-beam lift assembly that is located generally inboardly from and adjacent to the side of the hanger and the beam of the axle/suspension system, for lifting the axle/suspension system during operation of the vehicle.

2. Background Art

The use of air-ride trailing and leading arm rigid beam-type axle/suspension systems has been popular in the heavy-duty truck and tractor-trailer industry for many years. Air-ride trailing and leading arm spring beam-type axle/suspension systems also are often used in the industry. For the purpose of convenience and clarity, reference herein will be made to beams, with the understanding that such reference is by way of example, and that the present invention applies to heavy-duty vehicle air-ride axle/suspension systems that utilize rigid-type beams or spring-type beams. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members which form the frame of the vehicle. More specifically, each beam is pivotally connected at one of its ends to a hanger, which in turn is attached to and depends from a respective one of the main members of the vehicle. The beams of the axle/suspension system can either be an overslung/top-mount configuration or an underslung/bottom-mount configuration. For the purposes of convenience and clarity hereinafter, a beam having an overslung/top-mount configuration shall be referred to as an overslung beam and a beam having an underslung/bottom-mount configuration shall be referred to as an underslung beam with the understanding that such reference is by way of example, and that the present invention applies to both overslung/top-mount configurations and underslung/bottom-mount configurations. An axle extends transversely between and typically is connected by some means to the beams of the pair of suspension assemblies at a selected location from about the mid-point of each beam to the end of the beam opposite from its pivotal connection end. The end of each beam opposite its pivotal connection end also is connected to a bellows air spring or its equivalent, which in turn is connected to a respective one of the main members. A height control valve is mounted on the hanger and is operatively connected to the beam in order to maintain the ride height of the vehicle. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle. One or more shock absorbers and a brake assembly also are mounted on the axle/suspension system.

Many commercial vehicles currently utilize suspension assemblies that can retract and thereby raise the axle of the axle/suspension system off the ground. Such suspension assemblies conventionally are known in the industry as lift axle suspensions or lift assemblies. Lift axle/suspension systems usually are paired or grouped with non-lift axle/suspension systems on a vehicle, the latter of which are commonly referred to as primary axle/suspension systems. The majority of lift axle/suspension systems utilize one or more pneumatic air springs to raise or retract the axle/suspension system. Pneumatic air springs of that type typically are referred to as air chambers and generally have been placed in a variety of locations relative to the axle/suspension system to accomplish the lifting function. Another set, usually a pair, of pneumatic air springs is utilized to lower or extend the axle/suspension system for assisting in supporting the vehicle load, and typically are referred to as ride air springs.

Lift axle/suspension systems usually are retracted or raised when the vehicle load is less than the load capacity of the primary or non-lift axle/suspension systems, or when greater vehicle maneuverability is required. A number of different types of pneumatic or electro-pneumatic systems have been employed to operate lift axle/suspension systems, depending on the application and end-user requirements. The present invention can be utilized with most types of such operating systems. Most such systems operate by simultaneously but independently supplying pressurized or compressed air to the air chambers of the lift assembly and exhausting air pressure from the ride air springs when it is desired to retract or raise the lift axle/suspension system. Conversely, when it is desired to lower the lift axle/suspension system to support a load, air pressure is supplied to the ride air springs and exhausted from the lift air springs.

Although many known prior art lift axle suspensions or lift assemblies accomplish their goal of raising and lowering the axle/suspension system, certain drawbacks are inherent in those lift axle suspensions. More particularly, one example of prior art lift axle suspensions includes air chambers that are located generally beneath the hanger and the beam of the axle/suspension system. More specifically, the air chambers of the prior art lift axle suspension are mounted on the front portion of the hanger and extend below the hanger. The prior art lift axle suspension is also connected to the underside of the beam of the axle/suspension system by a pivot arm bracket that urges the beam upwardly when the lift air springs are inflated. These prior art lift axle/suspension systems are effective for applications where ground clearance is not an issue. However, in applications where ground clearance is minimized, such as in an application for a low-boy trailer having an underslung beam configuration, use of these prior art lift axle/suspension systems generally result in an inadequate amount of ground clearance, in turn resulting in impact of the components of the lift axle suspension with the ground, which can result in damage or reduced life of the lift axle suspension and/or the axle/suspension system.

Another example of known prior art lift axle suspensions includes a single air chamber that is located between the suspension assemblies of the axle/suspension system. Although this arrangement allows for increased ground clearance, it reduces the usable space between the suspension assemblies for trailer components such as air tanks, and drop center cross members. Moreover, because these prior art lift axle suspensions must span the entire width between the suspension assemblies, they are heavy and therefore reduce the amount of cargo that can be carried by the heavy-duty vehicle. In addition, they require lift assemblies having different widths to accommodate trailers having larger or smaller widths, thereby complicating assembly of the lift axle suspension.

Still other prior art lift axle suspensions include air chambers that are located generally in front of the hangers of the axle/suspension system. These prior art lift axle suspensions can affect the longitudinal spacing of the axle/suspension systems, thereby limiting the range of longitudinal axle spacing that is available between the axle/suspension systems.

There are many variations of the above-described prior art lift axle suspensions which exhibit the same disadvantages as those set forth above.

The preferred embodiment side-beam lift assembly of the present invention overcomes the problems associated with the prior art lift axle suspensions described above. More specifically, the preferred embodiment side-beam lift assembly of the present invention overcomes the problem of inadequate ground clearance found in some prior art lift axle suspensions by locating the air chamber of the lift assembly as well as the lift mechanism itself directly inboardly from and adjacent to the hanger and the beam, thereby providing increased ground clearance over the prior art lift assemblies. In addition, the side-beam lift assembly of the present invention has a reduced weight and provides additional useable space, particularly between the spaced-apart suspension assemblies of its axle/suspension system, for trailer components such as air tanks and drop-center cross members and the like. Moreover, the side-beam lift assembly of the present invention, because it includes a curb-side axle lift assembly for the curb-side suspension assembly and a driver-side axle lift assembly for the driver-side suspension assembly, is capable of being utilized on trailers having different widths without requiring any modification to the components of the lift assembly, thereby simplifying assembly of the lift axle suspension. Furthermore, because the side-beam lift assembly of the present invention is located entirely between the suspension beams of the axle/suspension system, it does not affect the longitudinal spacing of the axle/suspension systems, in turn allowing a wider range of available longitudinal axle spacing between the axle/suspension systems.

SUMMARY OF THE INVENTION

Objectives of the present invention include providing a lift assembly for heavy-duty vehicles that allows increased ground clearance over prior art lift assemblies.

A further objective of the present invention is to provide a lift assembly for heavy-duty vehicles that reduces weight and allows additional useable space between the spaced apart suspension assemblies of the axle/suspension system.

Yet another objective of the present invention is to provide a lift assembly for heavy-duty vehicles that is capable of being utilized on trailers having different widths without requiring any modifications to the components of the lift assembly, thereby simplifying assembly of the lift axle suspension.

Still another objective of the present invention is to provide a lift assembly for heavy-duty vehicles that allows a wider range of available longitudinal axle spacing between the axle/suspension systems.

These objectives and advantages are obtained by the lift assembly for a suspension assembly of an axle/suspension system of a heavy-duty vehicle which includes a lift assembly attached to a hanger and a beam of the suspension assembly. The lift assembly is generally adjacent to and inboardly of or outboardly of the suspension assembly.

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
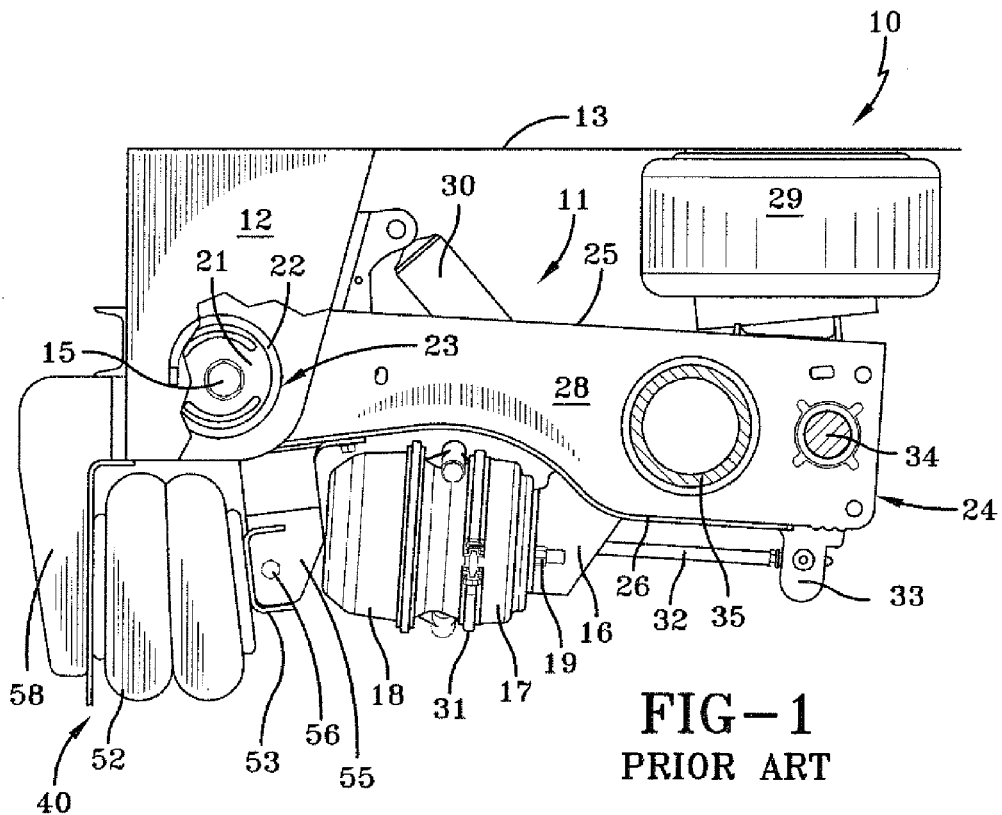
FIG. 1 is a side elevational view of a prior art underbeam axle lift assembly mounted on a suspension assembly of an axle/suspension system, with portions in section and portions broken away, showing one of the lift assembly air chambers mounted on and beneath the hanger and beam of its respective suspension assembly.

In order to better understand the side-beam lift assembly of the present invention, a prior art lift axle suspension or lift assembly utilized in conjunction with an air-ride beam-type trailing arm axle/suspension system 10 for a tractor trailer is indicated generally at 40, is shown in FIG. 1 and will be described in detail below. Inasmuch as axle/suspension system 10 includes generally identical suspension assemblies 11 each suspended from a respective one of a pair of hangers 12, only one of the suspension assemblies will be described herein, as shown in prior art FIGS. 1-2 in an overslung configuration. Hanger 12 is, by any suitable means, securely mounted on and depends from the underside of main member 13 of the trailer of a semi-trailer or other vehicle.

A bushing assembly 23 having a bushing 21 and a mounting tube 22, is pivotally mounted on hanger 12 by any suitable means such as a bolt 15. Bushing 21 preferably is of the type having multifunctional characteristics. More specifically, the multi-functional characteristics include required load and deflection ratios, or static rates, of varying levels in different directions for semi-trailer axle/suspension system applications. The bushing static rate is stiff in the horizontal radial direction, so that axle/suspension system 10 remains substantially perpendicular to the direction of movement of the semi-trailer despite horizontal loading which may be placed on the axle/suspension system, and relatively soft in the vertical radial direction, to enable the suspension system and bushing 21 to absorb vertical loading shocks and provide a smooth ride for the vehicle occupants and any cargo carried by the vehicle.

The front end of a trailing arm or beam 24 in turn is rigidly attached to mounting tube 22 of bushing 23 by any suitable means such as welding. Beam 24 generally is rectangular-shaped and includes spaced-apart top and bottom walls 25 and 26, respectively, and spaced-apart inboard (not shown) and outboard sidewalls 28. Top wall 25 is formed integrally with the inboard sidewall and outboard sidewall 28 to form an inverted generally U-shaped structure. Bottom wall 26 extends between, is welded to, and interconnects the inboard sidewall and outboard sidewall 28. An air spring 29 is suitably mounted on and extends between the upper surface of the rear end of top wall 25 and the underside of main member 13 of the vehicle. A shock absorber 30 extends between and is mounted on the inboard sidewall of suspension beam 24 and hanger 12.

A dual brake chamber 31 of the vehicle braking system is mounted on a bracket 16, which in turn is mounted on and depends from bottom wall 26 of suspension beam 24, by passage of a piston rod 32 of dual chamber 31 through an opening (not shown) formed in the bracket. Fasteners 19 incorporated into a service brake chamber 17 of dual brake chamber 31, such as threaded bolts, are passed through openings (not shown) formed in bracket 16 to secure the brake chamber to the bracket. Dual brake chamber 31 includes service brake chamber 17 and a parking brake chamber 18. Brake chamber piston 32 in turn is pivotally attached to a slack adjuster 33, which in turn is immovably mounted on a cam shaft 34 of the braking system to provide for transfer of in-line loads from the brake chamber piston into a torsional load on the cam shaft.

An axle 35 extends between and is immovably captured in suspension beam 24 and its corresponding opposite suspension beam of axle/suspension system 10. A set of wheels/tires (not shown) is mounted on each end of axle 35.

Figure 2:
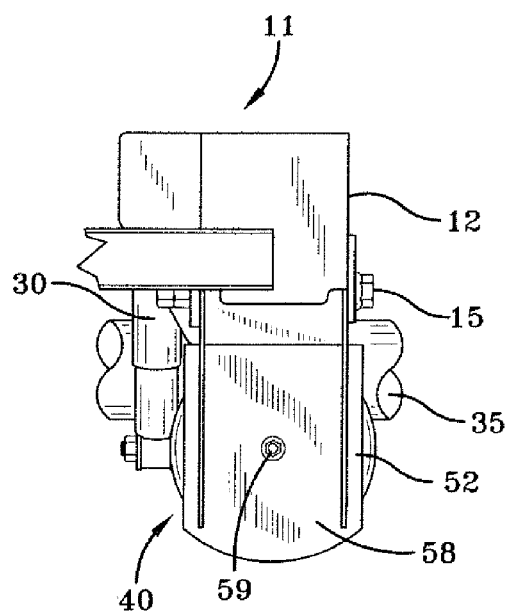
FIG. 2 is a fragmentary front view of the driver-side suspension assembly and underbeam axle lift assembly shown in FIG. 1.

Prior art axle lift assembly 40 includes an elastomeric bellows-type air chamber 52. A rear end of air chamber 52 is immovably attached to a short, transversely extending U-shaped channel 53 by a pair of transversely-spaced fasteners (not shown). U-shaped channel 53 in turn is immovably and removably mounted on a bracket 55 by fasteners 56. Bracket 55 in turn is immovably attached to beam bottom wall 26 by fasteners (not shown). As best depicted in FIGS. 1-2, a front end of air chamber 52 is immovably attached to a support member 58. More specifically, support member 58 is a vertically extending member which is immovably attached to a front surface of hanger 12, such as by welds. A fastener 59 (FIG. 2), such as a threaded bolt, is incorporated into a front end of air chamber 52 and passes through an opening (not shown) formed in support member 58, and a nut is threadably attached to the bolt for completing the immovable and removable mounting of the air chamber on hanger 12 and beam 24.

It can be seen that prior art axle lift assembly 40 provides enough clearance, when mounted beneath beam 11 and hanger 12, to accommodate a dual brake chamber 31 also mounted beneath the beam. However, because it is located underneath the hanger, it may not provide sufficient ground clearance for certain applications, such as a low-boy trailer having an underslung beam configuration, where the ground clearance is limited. These potential complications, as well as the problems set forth above with respect to the other prior art lift axle suspensions, are solved by the side-beam lift assembly of the present invention, which is described in detail below.

Figure 3:
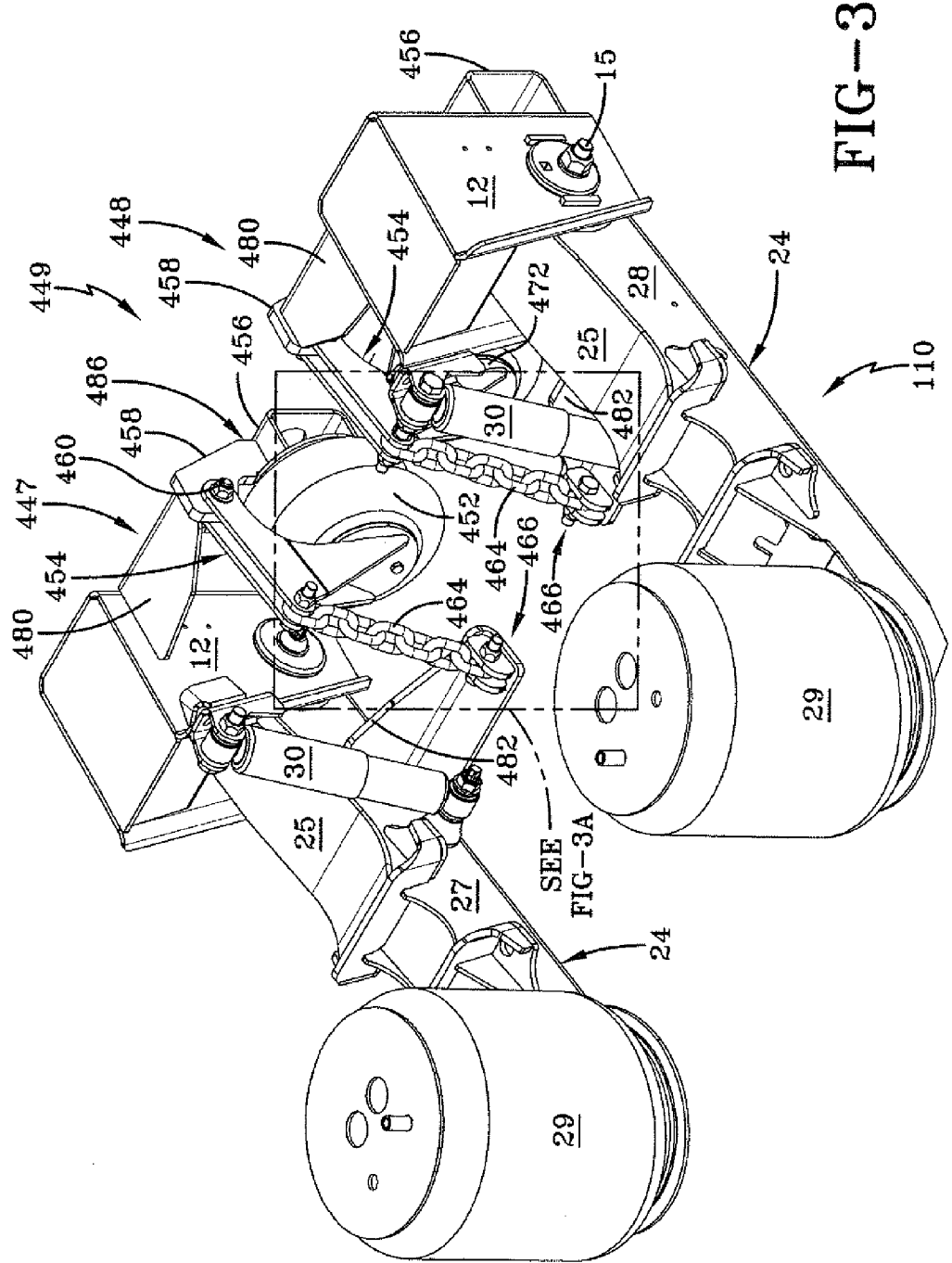
FIG. 3 is a top rear curb-side perspective view of a preferred embodiment side-beam lift assembly of the present invention mounted on an underslung axle/suspension system, with portions of the axle/suspension system removed, and showing a driver-side and a curb-side lift assembly mounted on respective ones of a pair of suspension assemblies.
Figure 3A:
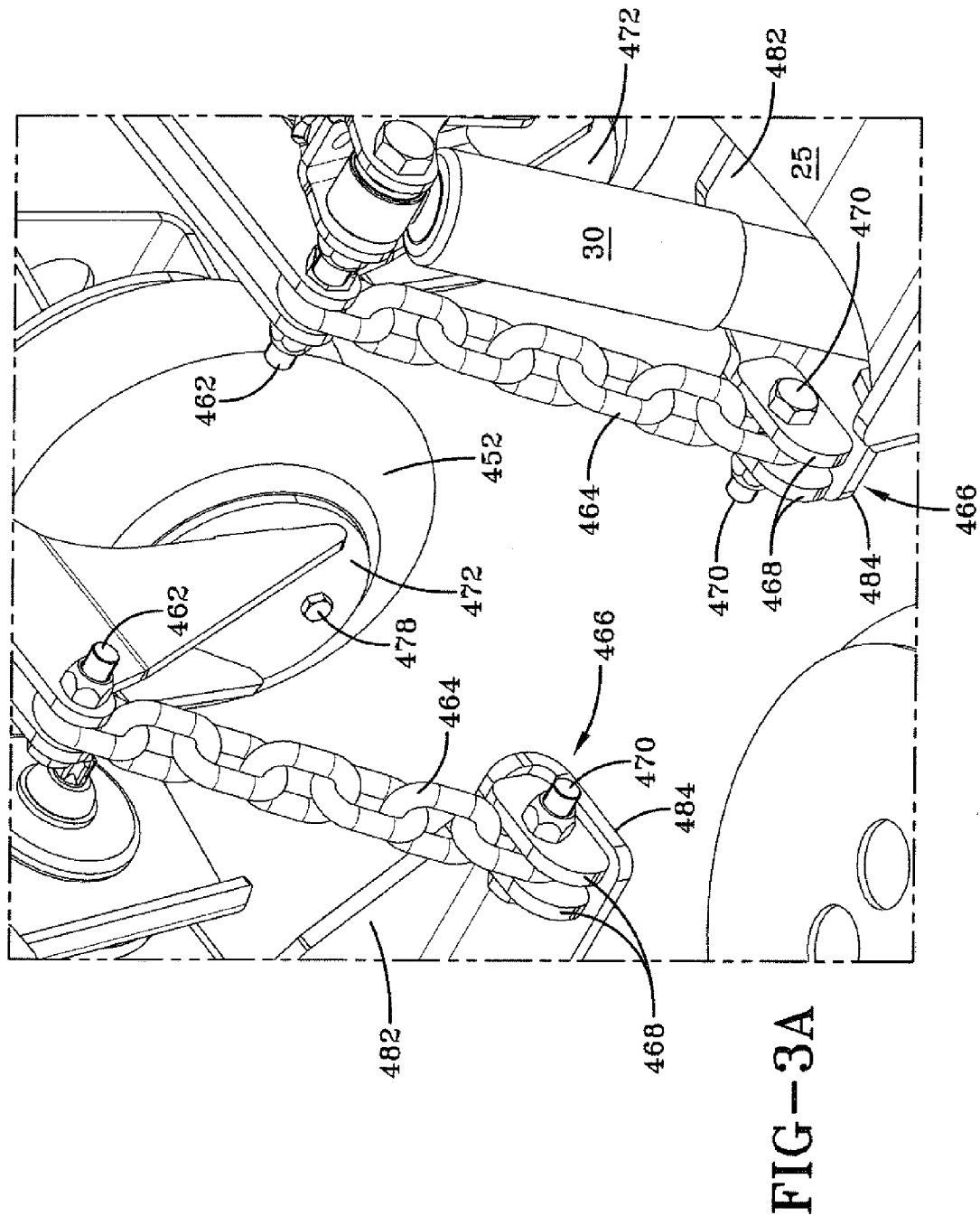
FIG. 3A is an enlarged view of portions of the driver-side and curb-side side-beam lift assemblies shown in FIG. 3.

A preferred embodiment side-beam lift assembly of the present invention is shown generally at 449 in FIGS. 3 and 3A, mounted on an underslung axle/suspension system 110. Underslung axle/suspension system 110 is similar to overslung axle/suspension system 10 shown in FIGS. 1-2 and described in detail above. The main difference between underslung axle/suspension system 110 and overslung axle/suspension system 10 is that in the underslung configuration, the beam is disposed under the axle rather than being disposed over the axle, which is the case with the overslung axle/suspension system. In addition, in the underslung configuration bottom wall 26 is formed integrally with an inboard sidewall 27 and outboard sidewall 28 of beam 24 to form a generally U-shaped structure. Top wall 25 extends between, is welded to, and interconnects inboard sidewall 27 and outboard sidewall 28 of beam 24.

Side-beam lift assembly 449 includes a driver-side axle lift assembly 447 and a curb-side axle lift assembly 448. Because driver-side axle lift assembly 447 and curb-side axle lift assembly 448 are generally mirror images of one another, for purposes of clarity and conciseness, only the curb-side axle lift assembly will be described in detail below.

Figure 4:
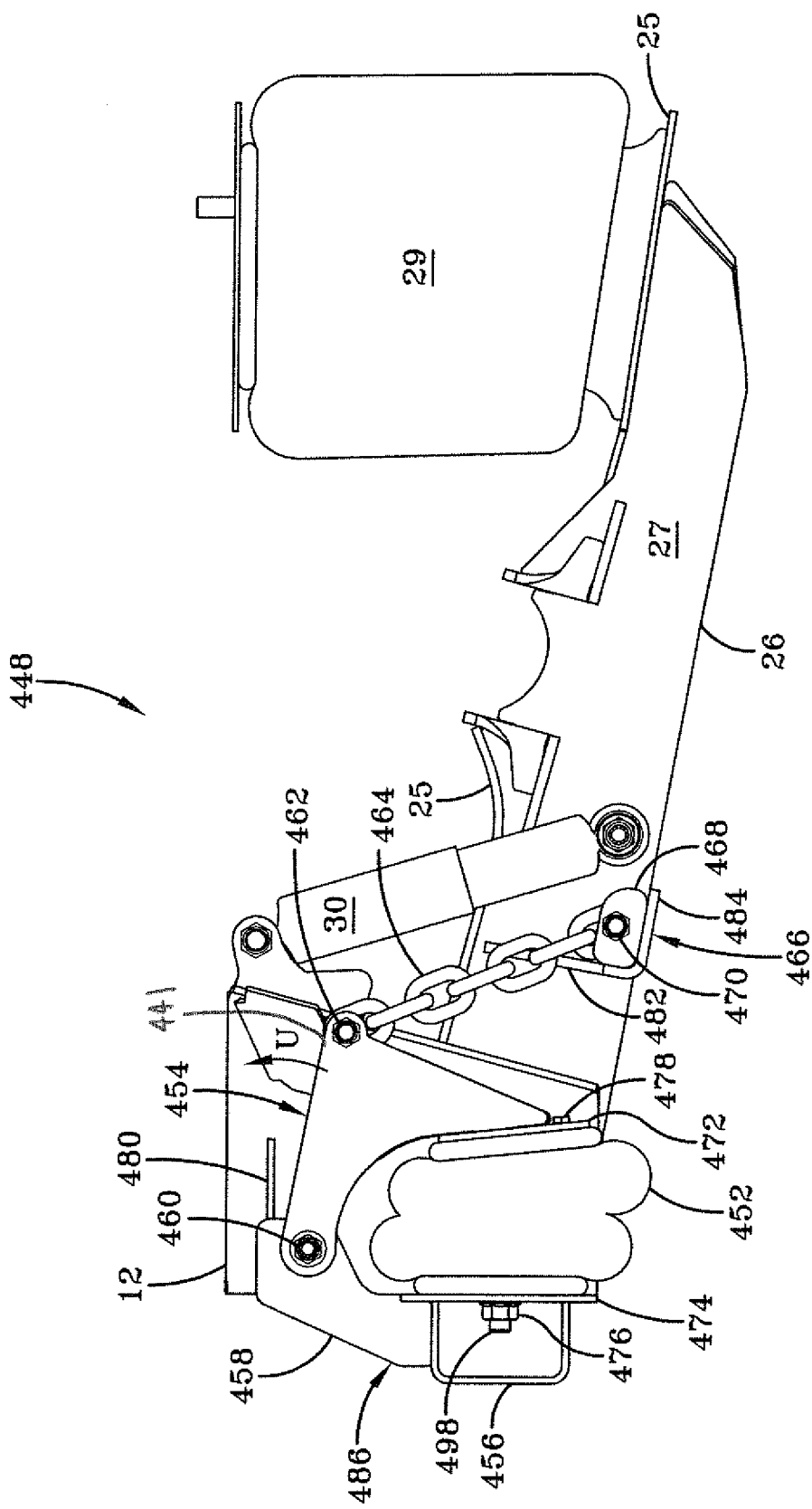
FIG. 4 is a side elevational view, looking in the outboard direction, of the curb-side suspension assembly shown in FIG. 3, and showing the curb-side lift assembly mounted on the hanger and the beam of the suspension assembly.
Figure 5:
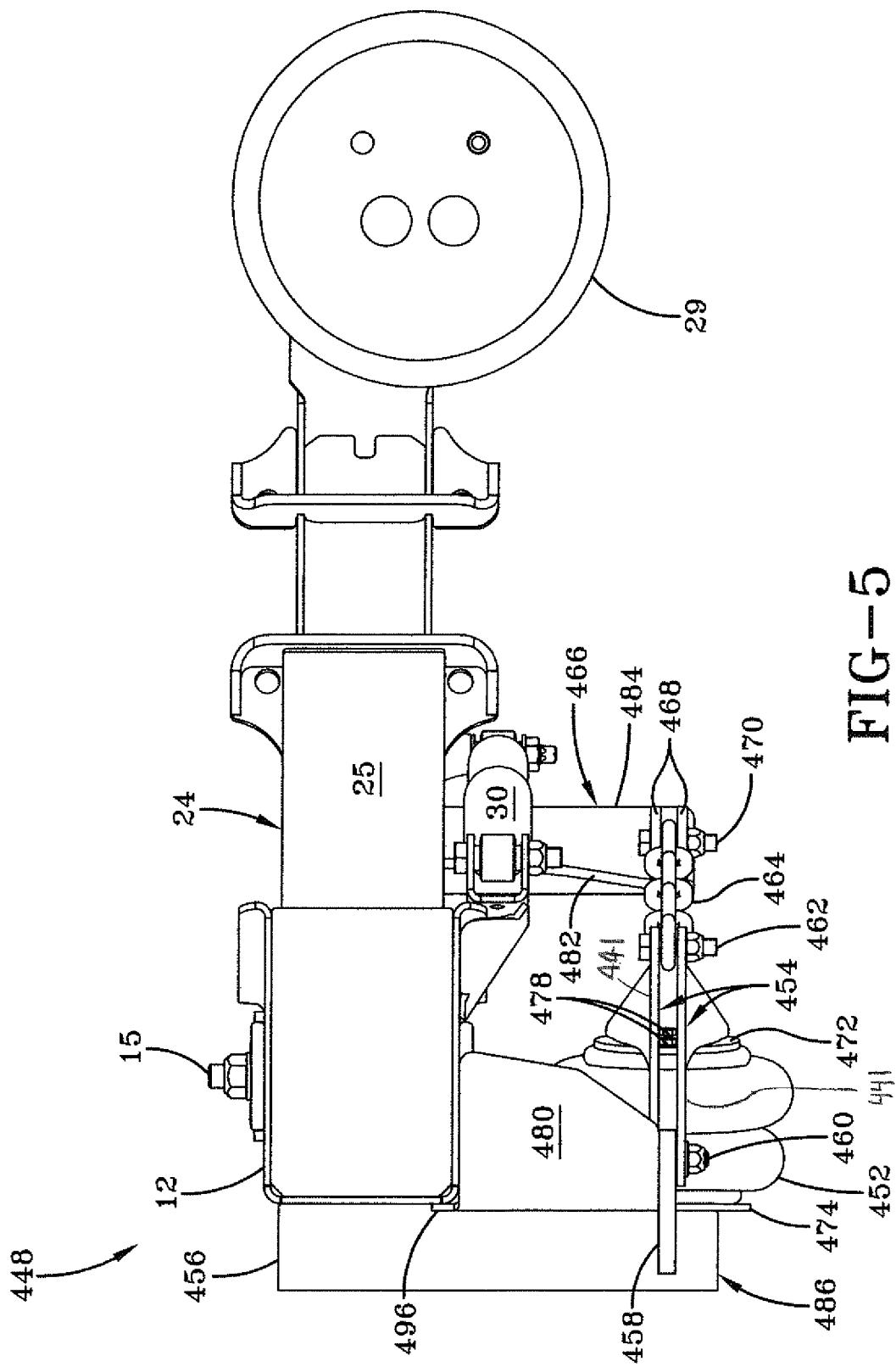
FIG. 5 is a top plan view of the curb-side suspension assembly shown in FIG. 3.

With additional reference to FIGS. 4-7, curb-side axle lift assembly 448 includes an elastomeric bellows-type air chamber 452, a support member assembly 486, a pivot arm assembly 454, a lift chain 464 and a beam support assembly 466. More particularly, support member assembly 486 includes a generally L-shaped plate 474 that extends vertically along the front surface of hanger 12. Plate 474 also includes an outboardly extending tab 496 (FIG. 7) and a horizontally extending upper support plate 480 (FIG. 5). A U-shaped channel 456 is attached to the lower front surface of plate 474 in a manner well known to those skilled in the art, such as by welding. Channel 456 is formed with an opening 497 (FIG. 7) near the inboard end of the channel. Opening 497 provides access to a front plate fastener 476, which is threadably engaged with a threaded bolt 498, which in turn is integrally formed with air chamber 452, and which extends through an opening (not shown) in plate 474 in order to mount the front portion of the air chamber on the front plate of support member assembly 486. A wing 458 extends between the upper surface of channel 456 and the inboard edge of upper support plate 480 to complete support member assembly 486. Support member assembly 486 is attached to hanger 12 via welds 495 (FIG. 7) which are laid along the outboard edge of the upper portion of front plate tab 496 and the upper and lower edges of the outboard portion of channel 456.

Pivot arm assembly 454 is formed from two generally transversely-spaced vertically extending generally triangular shaped plates 441. Pivot arm assembly 454 is pivotally attached to support member assembly wing 458 via arm-wing fastener 460, which extends through aligned openings (not shown) formed in pivot arm assembly plates 441 and the wing. Pivot arm assembly 454 includes a front plate 472, which is immovably attached to the lower portion of plates 441 in a manner well known in the art, such as by welds (not shown). Front plate 472 is in turn immovably attached to air chamber 452 via rear plate fasteners 478. Pivot arm assembly 454 is also attached to the upper end of lift chain 464 via an arm-chain fastener 462, which extends through aligned openings (not shown) formed in pivot arm assembly plates 441 and the upper link of lift chain.

Figure 6:
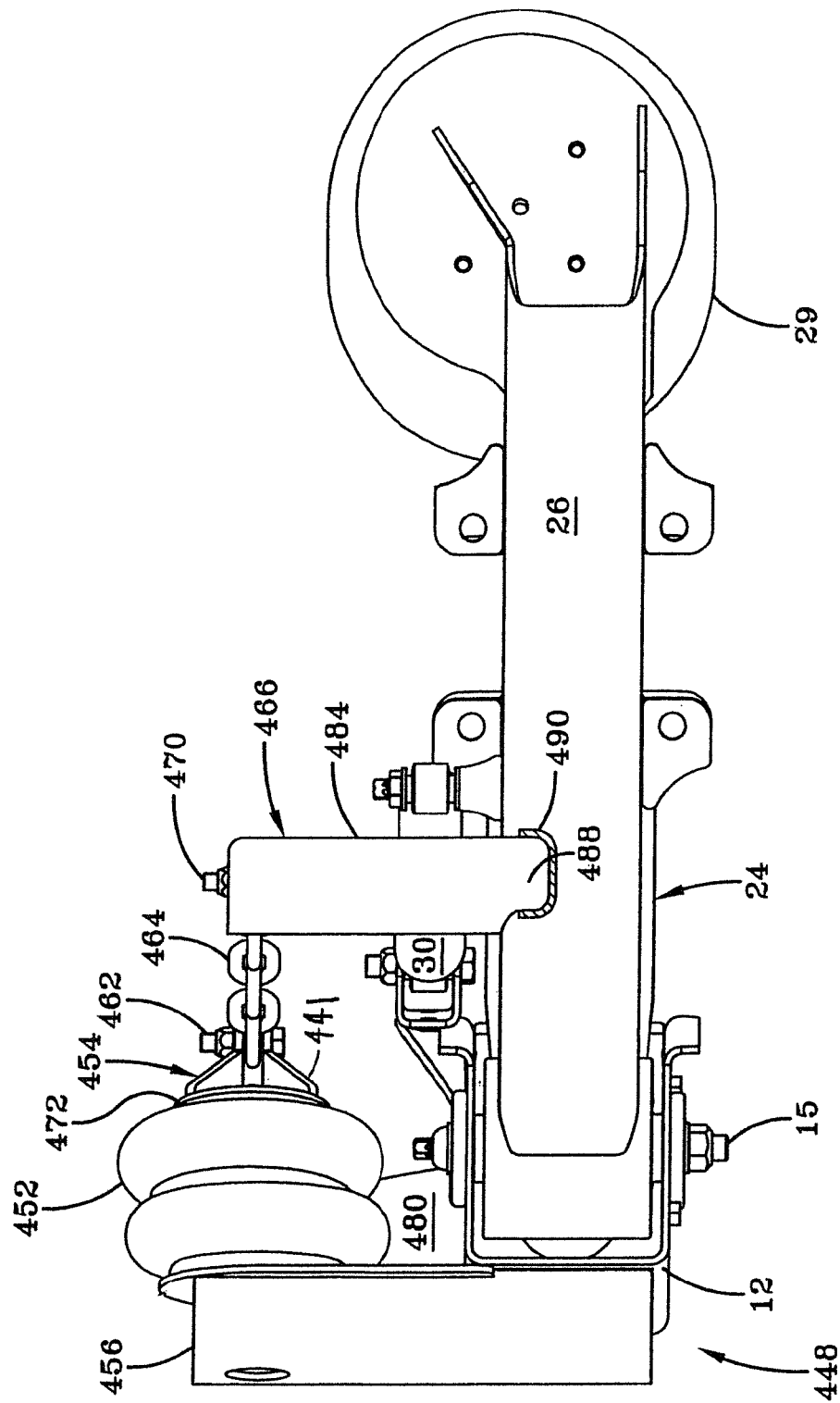
FIG. 6 is a bottom plan view of the curb-side suspension assembly shown in FIG. 3.
Figure 7:
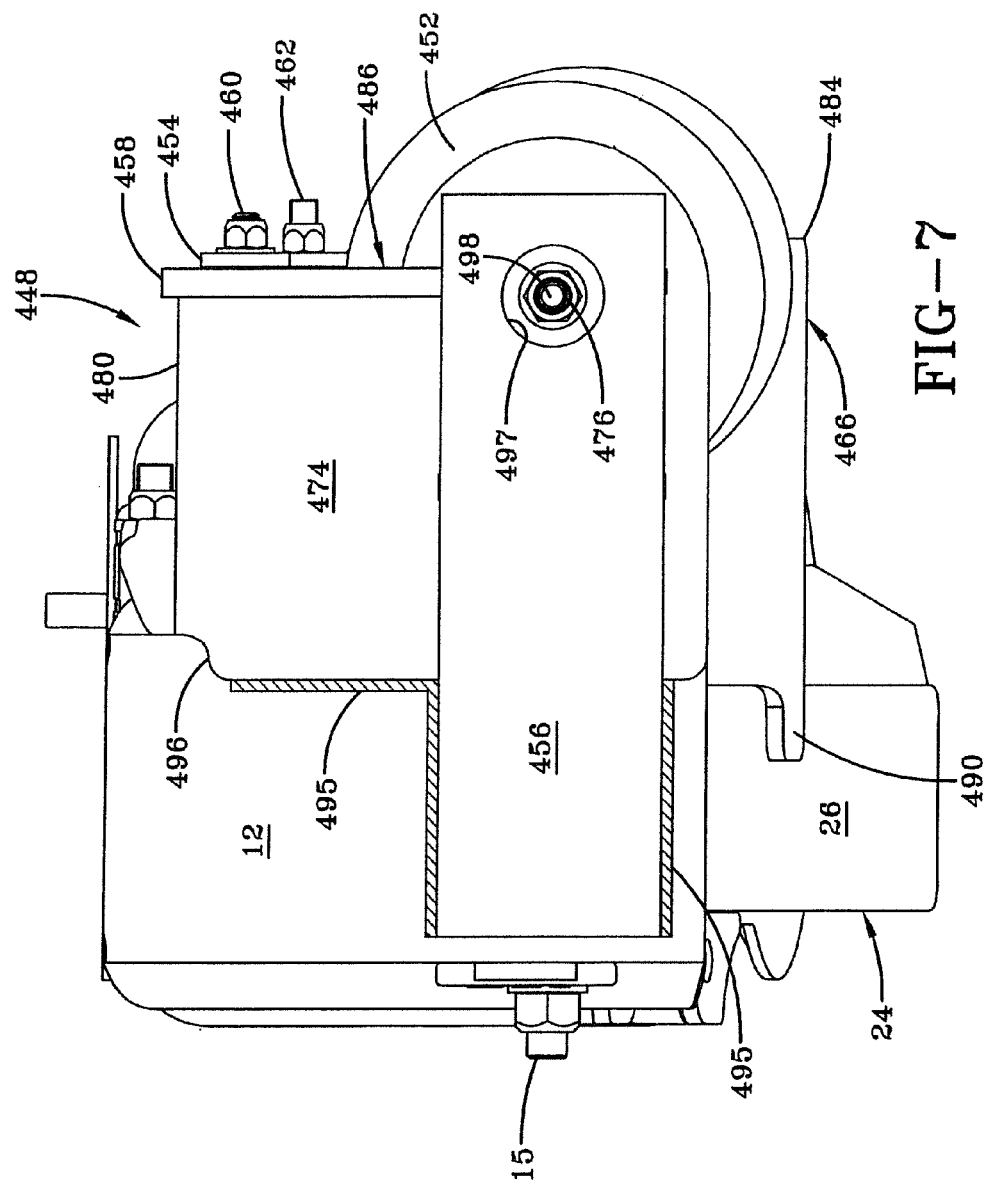
FIG. 7 is an enlarged front elevational view of the curb-side suspension assembly shown in FIG. 3.

Beam support assembly 466 is mounted on beam 24 of the axle/suspension system. More particularly, beam support assembly 466 is a generally L-shaped channel with the open portion of the channel facing generally rearwardly. More specifically, beam support assembly 466 includes a vertical plate 482 and a horizontal plate 484. The outboard end of beam support assembly horizontal plate 484 includes an outboardly extending tab 488 (FIG. 6). Beam support assembly 466 is mounted on the beam bottom wall 26 via welds 490 (FIG. 6) which are laid along the junction between tab 488 and the beam bottom wall. Beam support assembly 466 further includes a vertically-spaced clevis 468 which is seated near the inboard end of the beam support assembly and is immovably attached to the rear surface of vertical plate 482 and to the upper surface of horizontal plate 484. A chain-shoulder fastener 470 is disposed through a pair of aligned openings (not shown) formed in clevis 468 and through the lower link of lift chain 464 in order to connect beam support assembly 466 to the lift chain.

Having now described the structure of side-beam lift assembly 449 of the present invention, its operation will now be described in detail below.

Both driver-side axle lift assembly 447 and curb-side axle lift assembly 448 operate simultaneously to lift the axle/suspension system. For purposes of clarity and conciseness, only the operation of curb-side axle lift assembly 448 will be described in detail below.

Figure 4A:
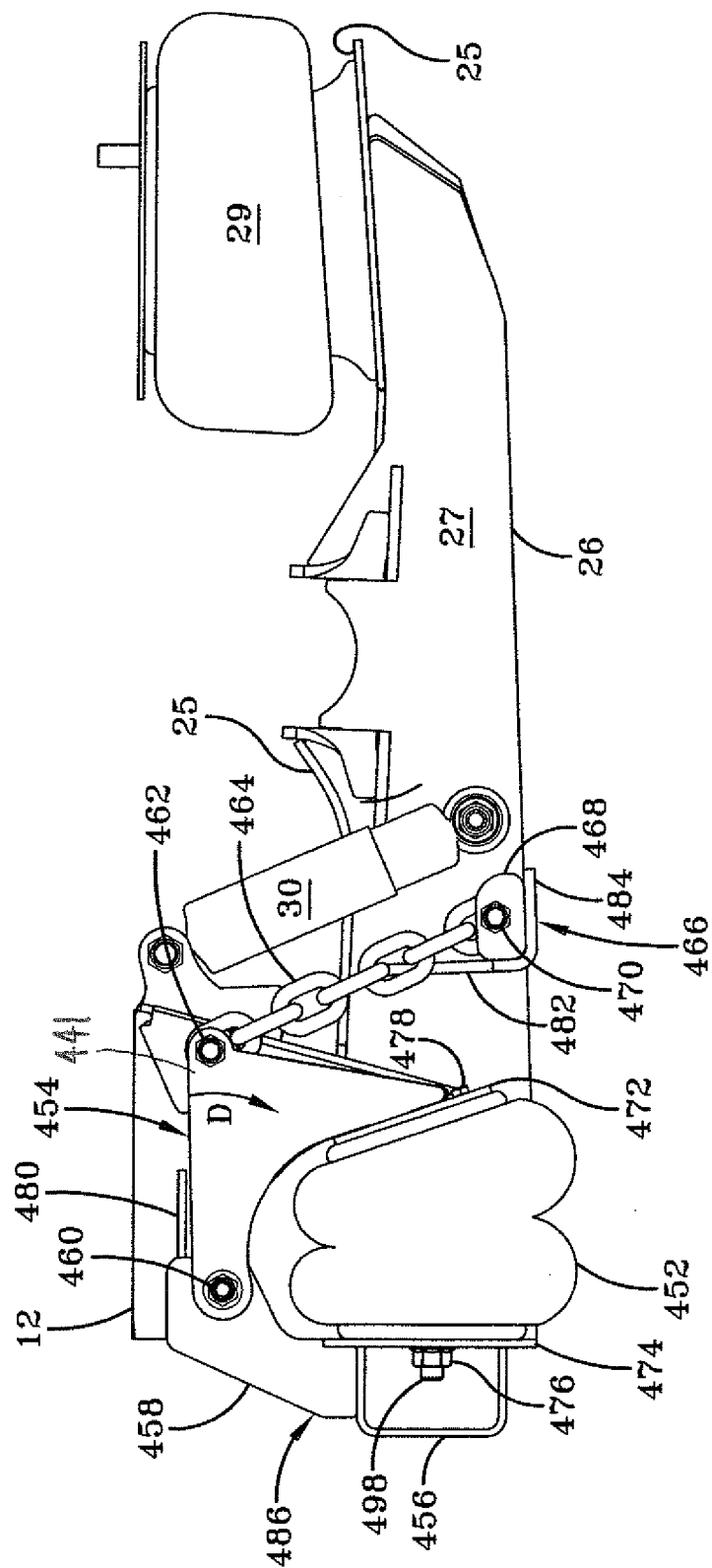
FIG. 4A is a view similar to FIG. 4, showing the curb-side lift assembly in a raised position.

Turning now to FIGS. 4 and 4A, when the operator of the heavy-duty vehicle desires to raise axle/suspension system 110 on which side-beam lift assembly 449 is mounted, ride air springs 29 are deflated and air chamber 452 is inflated, which causes pivot arm 454 to pivot in direction U (FIG. 4), pulling lift chain 464, beam support assembly 466 and beam 12 upwardly, thereby raising the axle/suspension system away from the ground. Axle/suspension system 110 is typically raised away from the ground when the vehicle load is less than the load capacity of the primary or non-lift axle/suspension systems or when greater vehicle maneuverability is required. Conversely, when the operator of the vehicle desires to lower axle/suspension system 110 on which side-beam lift assembly 449 is mounted, ride air springs 29 are inflated and air chamber 452 is deflated, which causes pivot arm 454 to pivot in direction D (FIG. 4A), lowering lift chain 464, beam support assembly 466 and beam 12, thereby lowering the axle/suspension system downwardly toward the ground. Axle/suspension system 110 is typically lowered into contact with the ground when the vehicle load is more than the load capacity of the primary or non-lift axle/suspension systems or when less vehicle maneuverability is required.

Preferred embodiment side-beam lift assembly 449 of the present invention overcomes the potential disadvantages associated with prior art lift assemblies, such as those described above, which include inadequate ground clearance, reduced space for trailer components, increased weight and detrimentally affecting longitudinal spacing of the axle/suspension system. By generally locating axle lift assemblies 447,448 inboardly from and generally adjacent to the side of their respective hanger 12 and beam 24, side-beam lift assembly 449 of the present invention provides increased ground clearance over the prior art lift axle/suspension systems. It is also contemplated that side-beam lift assembly 449 of the present invention could be mounted outboardly of the suspension assembly without changing the overall concept or operation of the present invention. In addition, preferred embodiment side-beam lift assembly 449 of the present invention has a reduced weight and provides additional space between suspension assemblies 11 and underneath the trailer for trailer components such as, air tanks and drop-center cross members, and the like. Moreover, side-beam lift assembly 449 of the present invention, because it includes curb-side axle lift assembly 448 for curb-side suspension assembly 11 and driver-side axle lift assembly 447 for the driver-side suspension assembly, is capable of being utilized on trailers having different widths without requiring any modification to the components of the lift assembly, thereby simplifying assembly of the lift axle suspension. Furthermore, because side-beam lift assembly 449 of the present invention is located entirely between suspension beams 28 of axle/suspension system 110, it does not affect the longitudinal spacing of the axle/suspension systems, in turn allowing a wider range of available longitudinal axle spacing between the axle/suspension systems.

It is contemplated that preferred embodiment side-beam lift assembly 449 of the present invention could be utilized on trucks, tractor-trailers or other heavy-duty vehicles having one or more than one axle without changing the overall concept or operation of the present invention. It is further contemplated that preferred embodiment side-beam lift assembly 449 of the present invention could be utilized in connection with vehicles having frames or subframes which are moveable or non-movable without changing the overall concept of the present invention. It is yet even further contemplated that preferred embodiment side-beam lift assembly 449 of the present invention could be utilized on all types of air-ride leading and/or trailing arm beam-type axle/suspension system designs known to those skilled in the art without changing the overall concept or operation of the present invention. For example, the present invention finds application in connection with axle/suspension systems having beams or arms that are made of materials other than steel, such as aluminum, other metals, metal alloys, composites, and/or combinations thereof. It is also contemplated that preferred embodiment side-beam lift assembly 449 of the present invention could be utilized in connection with axle/suspension systems having either an overslung/top-mount configuration or an underslung/bottom-mount configuration, without changing the overall concept of the present invention. The present invention also finds application in connection with axle/suspension systems having beams or arms with different designs and/or configurations than that shown and described herein, such as solid beams, shell-type beams, truss structures, intersecting plates, spring beams and parallel plates. It is yet even further contemplated that preferred embodiment side-beam lift assembly 449 of the present invention could be utilized in conjunction with axles having varied wall thicknesses, different shapes, and being formed or constructed from different materials, without changing the overall concept or operation of the present invention. It is even further contemplated that preferred embodiment side-beam lift assembly 449 of the present invention could be utilized in conjunction with many types of air-ride rigid beam-type axle/suspension systems, including those using U-bolts, U-bolt brackets/axle seats and the like, without changing the overall concept or operation of the present invention.

Accordingly, the side-beam lift assembly of the present invention is simplified, provides an effective, safe, inexpensive and efficient structure and method which achieves all the enumerated objectives, provides for eliminating difficulties encountered with prior lift assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the side-beam lift assembly of the present invention is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A lift assembly for a suspension assembly of an axle/suspension system of a heavy-duty vehicle comprising;
    an air chamber, a support member assembly, a pivot arm assembly and a beam support assembly, said support member assembly attached directly to a hanger of said suspension assembly, to said air chamber, and pivotally attached to said pivot arm assembly, said air chamber attached to said pivot arm assembly, said pivot arm assembly pivotally attached to said beam support assembly, said beam support assembly attached to a beam of said suspension assembly, said lift assembly being generally adjacent to and inboardly of or outboardly of the suspension assembly, said air chamber being oriented so that expansion of the air chamber occurs in a generally horizontal direction.

2. The lift assembly for a suspension assembly of an axle/suspension system of a heavy-duty vehicle of claim 1, said lift assembly being located on an inboard side of said suspension assembly.

3. The lift assembly for a suspension assembly of an axle/suspension system of a heavy-duty vehicle of claim 1, said pivotal attachment of said pivot assembly to said beam support assembly comprises a chain.

4. The lift assembly for a suspension assembly of an axle/suspension system of a heavy-duty vehicle of claim 1, said air chamber comprising an elastomeric bellows.

5. The lift assembly for a suspension assembly of an axle/suspension system of a heavy-duty vehicle of claim 1, said support assembly further comprising;
    a) a generally L-shaped plate extending vertically along said hanger of said suspension assembly,
    b) a generally U-shaped channel said U-shaped channel attached to the lower front surface of said L-shaped plate,
    c) a wing extending between and being attached to said channel and said L-shaped plate, said L-shaped plate being attached to said air chamber.

6. The lift assembly for a suspension assembly of an axle/suspension system of a heavy-duty vehicle of claim 1, said pivot arm assembly comprising;
    a) two horizontally-spaced vertically extending plates, said plates pivotally attached to said support assembly; and
    b) a front plate attached to said air chamber.

7. The lift assembly for a suspension assembly of an axle/suspension system of a heavy-duty vehicle of claim 1, said beam support assembly comprising a generally L-shaped channel and a clevis, said clevis pivotally attached to said pivot arm assembly.

8. A lift assembly for a suspension assembly of an axle/suspension system of a heavy-duty vehicle comprising:
    an air chamber, a support member assembly, a pivot arm assembly and a beam support assembly, said support member assembly attached to a hanger of said suspension assembly, to said air chamber, and pivotally attached to said pivot arm assembly, said air chamber attached to said pivot arm assembly, said pivot arm assembly pivotally attached to said beam support assembly, said beam support assembly attached to a beam of said suspension assembly, said lift assembly being generally adjacent to and inboardly of or outboardly of the suspension assembly, said support assembly further comprising;
    a) a generally L-shaped plate extending vertically along said hanger of said suspension assembly,
    b) a generally U-shaped channel said U-shaped channel attached to the lower front surface of said L-shaped plate, and
    c) a wing extending between and being attached to said channel and said L-shaped plate, said L-shaped plate being attached to said air chamber.

9. A lift assembly for a suspension assembly of an axle/suspension system of a heavy-duty vehicle comprising:
    an air chamber, a support member assembly, a pivot arm assembly and a beam support assembly, said support member assembly attached to a hanger of said suspension assembly, to said air chamber, and pivotally attached to said pivot arm assembly, said air chamber attached to said pivot arm assembly, said pivot arm assembly pivotally attached to said beam support assembly, said beam support assembly attached to a beam of said suspension assembly, said lift assembly being generally adjacent to and inboardly of or outboardly of the suspension assembly, said pivot arm assembly comprising;
    a) two horizontally-spaced vertically extending plates, said plates pivotally attached to said support assembly; and
    b) a front plate attached to said air chamber.

10. A lift assembly for a suspension assembly of an axle/suspension system of a heavy-duty vehicle comprising:
    An air chamber, a support member assembly, a pivot arm assembly and a beam support assembly, said support member assembly attached to a hanger of said suspension assembly, to said air chamber, and pivotally attached to said pivot arm assembly, said air chamber attached to said pivot arm assembly, said pivot arm assembly pivotally attached to said beam support assembly, said beam support assembly attached to a beam of said suspension assembly, said lift assembly being generally adjacent to and inboardly of or outboardly of the suspension assembly, said beam support assembly comprising a generally L-shaped channel and a clevis, said clevis pivotally attached to said pivot arm assembly.

* * * * *

UNITED STATES PATENT AND TRADEMARK OFFICE
CERTIFICATE OF CORRECTION

PATENT NO. : 8,459,666 B2
APPLICATION NO. : 13/301056
DATED : June 11, 2013
INVENTOR(S) : Daniel J. Piehl et al.

It is certified that error appears in the above-identified patent and that said Letters Patent is hereby corrected as shown below:

On the Title page, item 73 under Assignee: delete the word "Hendrikson" and insert therefore the word --Hendrickson--.

Signed and Sealed this
Fifth Day of November, 2013

Teresa Stanek Rea
*Deputy Director of the United States Patent and Trademark Office*